United States Patent [19]

Chu et al.

[11] Patent Number: 4,601,993

[45] Date of Patent: Jul. 22, 1986

[54] CATALYST COMPOSITION DEWAXING OF LUBRICATING OILS

[75] Inventors: Pochen Chu, West Deptford; Jeffrey H. Yen, Swedesboro, both of N.J.

[73] Assignee: Mobil Oil Corporation, New York, N.Y.

[21] Appl. No.: 661,632

[22] Filed: Oct. 17, 1984

Related U.S. Application Data

[63] Continuation-in-part of Ser. No. 614,072, May 25, 1984, abandoned.

[51] Int. Cl.$^4$ ............................................. B01J 29/32
[52] U.S. Cl. .................................... 502/66; 502/67; 208/111
[58] Field of Search ................... 502/66, 67, 68, 69; 208/111

[56] References Cited

U.S. PATENT DOCUMENTS

| | | | |
|---|---|---|---|
| Re. 28,398 | 4/1975 | Chen et al. | 208/111 |
| 3,755,138 | 8/1973 | Chen et al. | 208/33 |
| 3,755,145 | 8/1973 | Orkin et al. | 208/111 |
| 3,758,402 | 9/1973 | Oleck et al. | 208/111 |
| 3,758,403 | 9/1973 | Rosinski et al. | 208/120 |
| 3,764,520 | 10/1973 | Kimberlin et al. | 208/111 |
| 3,894,938 | 7/1975 | Gorring et al. | 208/97 |
| 3,956,102 | 5/1976 | Chen et al. | 208/93 |
| 4,053,532 | 10/1973 | Ireland et al. | 208/111 |
| 4,222,855 | 9/1980 | Pelrine et al. | 208/111 |
| 4,239,654 | 12/1980 | Gladrow et al. | 502/67 |
| 4,247,388 | 1/1981 | Banta et al. | 208/111 |
| 4,372,839 | 2/1983 | Oleck et al. | 208/59 |
| 4,419,220 | 12/1983 | LaPierre et al. | 208/111 |
| 4,428,819 | 1/1984 | Shu et al. | 208/46 |

*Primary Examiner*—Andrew H. Metz
*Assistant Examiner*—O. Chaudhuri
*Attorney, Agent, or Firm*—Alexander J. McKillop; Michael G. Gilman; Dennis P. Santini

[57] ABSTRACT

Hydrocarbon lubricating oil feedstocks are dewaxed by passing the waxy feedstock over a catalyst bed containing a mixture of medium pore zeolite and large pore zeolite catalysts havig a Constraint Index less than 2 and having hydroisomerization activity in the presence of a hydrogenation component.

11 Claims, 9 Drawing Figures

CATALYST COMPOSITION DEWAXING OF LUBRICATING OILS

CROSS-REFERENCE TO RELATED CASES

This application is a continuation-in-part of Ser. No. 614,072, filed May 25, 1984, now abandoned.

BACKGROUND OF THE INVENTION

1. Field of the Invention

This invention relates to the manufacture of high quality lubricating oil derived particularly from the catalytic dewaxing of petroleum distillate fractions. It is especially directed to the preparation of lubricating oils having a high viscosity index (V.I.), a high 650° F.+ yield and reduced overnight cloud problems.

2. Discussion of the Prior Art

Refining suitable petroleum crude oils to obtain a variety of lubricating oils which function effectively in diverse environments has become a highly developed and complex art. Although the broad principles involved in refining are qualitatively understood, the art is encumbered by quantitative uncertainties which require a considerable resort to empiricism in practical refining. Underlying these quantitative uncertainties is the complexity of the molecular constitution of lubricating oils. Because lubricating oils for the most part are based on petroleum fractions boiling above about 450° F., the molecular weights of the hydrocarbon constituents are high and these constituents display almost all conceivable structure types. This complexity and its consequences are referred to in well-known treatises, such as, for example, "Petroleum Refinery Engineering", by W. L. Nelson, McGraw-Hill Book Company, Inc., New York, NY, 1958 (Fourth Edition). For purposes of this invention, lubricating oil or lube oil is that part of a hydrocarbon feedstock having a boiling point of 650° F. or higher as determined by ASTM D-97 test method.

In general, the basic premise in lubricant refining is that a suitable crude oil, as shown by experience or by assay, contains a quantity of lubricant stock having a predetermined set of properties, such as, for example, appropriate viscosity, oxidation stability, and maintenance of fluidity at low temperatures. The process of refining to isolate that lubricant stock consists of a set of subtractive unit operations which removes the unwanted components. The most important of these unit operations include distillation, solvent refining and dewaxing, which basically are physical separation processes in the sense that if all the separated fractions were recombined, one would reconstitute the crude oil.

A refined lubricant stock may be used by itself, or it may be blended with another refined lubricant stock having different properties. Or, the refined lubricant stock, prior to use as a lubricant, may be compounded with one or more additives which function, for example, as antioxidants, extreme pressure additives, and V.I. improvers.

For the preparation of a high grade distillate lubricating oil stock, the current practice is to vacuum distill an atmospheric tower residuum from an appropriate crude oil as the first step. This step provides one or more raw stocks within the boiling range of about 450° to 1050° F. After preparation of a raw stock of suitable boiling range, it is extracted with a solvent, e.g., furfural, phenol, sulfolane, or chlorex, which is selective for aromatic hydrocarbons, and which removes undesirable components. The raffinate from solvent refining is then dewaxed, for example, by admixing with a solvent, such as a blend of methyl ethyl ketone and toluene. The mixture is chilled to induce crystallization of the paraffin waxes, which are then separated from the raffinate. Sufficient quantities of wax are removed to provide the desired pour point for the raffinate.

Other processes, such as hydrofinishing or clay percolation, may be used if needed to reduce the nitrogen and sulfur content or improve the color of the lubricating oil stock.

Viscosity index (V.I.) is a quality parameter of considerable importance for distillate lubricating oils to be used in automotive engines and aircraft engines subject to wide variations in temperature. This index indicates the degree of change of viscosity with temperature. A high V.I. of 100 indicates an oil that does not tend to become viscous at low temperature or become thin at high temperatures. Measurement of the Saybolt Universal Viscosity of an oil at 100° and 210° F., and referral to correlations, provides a measure of the V.I. of the oil. For purposes of the present invention, whenever V.I. is referred to, it is meant the V.I. as noted in the Viscosity Index tabulations of the ASTM (D567), published by ASTM, 1916 Race Street, Philadelphia, PA, or equivalent.

The dewaxing mechanism of catalytic hydrodewaxing is different from that of solvent dewaxing, resulting in some differences in chemical composition. Catalytically dewaxed products produce a haze on standing at 10° F. above specification pour point for more than twelve hours—known as the Overnight Cloud (ONC) formation. The extent of this ONC formation is less severe with solvent dewaxed oils. Although such an ONC formation does not affect the product quality of catalytically dewaxed oils, it is beneficial to reduce the Overnight Cloud (ONC) formation, since in some areas of the marketplace any increase in ONC is considered undesirable.

In recent years, catalytic techniques have become available for dewaxing of petroleum stocks. A process of that nature developed by British Petroleum is described in *The Oil and Gas Journal*, dated Jan. 6, 1975, at pages 69-73. See also U.S. Pat. No. 3,668,113.

U.S. Pat. No. Re. 28,398 describes a process for catalytic dewaxing with a catalyst comprising zeolite ZSM-5. Such a process combined with catalytic hydrofinishing is described in U.S. Pat. No. 3,894,938.

U.S. Pat. No. 3,755,138 describes a process for mild solvent dewaxing to remove high quality wax from a lube stock, which is then catalytically dewaxed to specification pour point.

U.S. Pat. No. 4,053,532 is directed towards a hydrodewaxing operation involving a Fischer-Tropsch synthesis product utilizing ZSM-5 type zeolites.

U.S. Pat. No. 3,956,102 is connected with a process involving the hydrodewaxing of petroleum distillates utilizing a ZSM-5 type zeolite catalyst.

U.S. Pat. No. 4,247,388 describes dewaxing operations utilizing ZSM-5 type zeolites of specific activity.

U.S. Pat. No. 4,222,855 describes dewaxing operations to produce lubricating oils of low pour point and of high V.I. utilizing zeolites including ZSM-23 and ZSM-35.

U.S. Pat. No. 4,372,839 describes a method for dewaxing crude oils of high wax content by contacting the oils with two different zeolites, e.g., ZSM-5 and ZSM-35.

U.S. Pat. No. 4,419,220 describes a dewaxing process utilizing a Zeolite Beta catalyst.

Copending U.S. patent application Ser. No. 631,681 describes a lubricating oil dewaxing process utilizing a zeolite catalyst having a Constraint Index not less than 1; an acidic catalytic material selected from the group consisting of Mordenite, TEA Mordenite, Dealuminized Y, Rare Earth Y, amorphous silica alumina, chlorinated alumina, ZSM-4 and ZSM-20; and a hydrogenation component.

The entire contents of these patents and application are herein incorporated by reference.

Thus, there are catalysts in the prior art useful for dewaxing processes which result in the production of lubricating oils of enhanced properties. However, the catalysts of the prior art often produce undesirable results. For example, when ZSM-5 is used to dewax a lube stock, unwanted high molecular-weight branched paraffins and naphthenic components with long alkyl branched chains are left behind due to their inability to freely diffuse into the pores of ZSM-5. Further, it will be shown in the examples to follow, see particularly Example 12, that Zeolite Beta requires increased temperatures in order to produce adequate yields of dewaxed lube stock. Thus, Zeolite Beta alone is not a preferred dewaxing catalyst.

It is an object of the present invention to overcome the deficiencies of the prior art.

It is additionally an object of the present invention to provide an improved catalyst useful for producing a dewaxed lubricating oil having higher V.I., higher 650° F.+ yield and less overnight cloud problems than the lubricating oil produced by prior art catalytic operations.

It is further an object of the present invention to produce a dewaxed lubricating oil having higher V.I., higher 650° F.+ yield and less overnight cloud problems than the lubricating oil produced by prior art catalytic operations.

These and other objects are fulfilled by the present invention, which is disclosed below.

SUMMARY OF THE INVENTION

It has now been found that lubricating oil feedstocks may be effectively dewaxed in a one-stage process utilizing, as a catalyst, a mixture of an intermediate-pore (or medium-pore) zeolite and a large pore crystalline silicate zeolite having a Constraint Index less than 2 and having hydroisomerization activity in the presence of a hydrogenation component, preferably platinum.

This process generally comprises contacting the feedstock at a temperature between about 500° F. and about 750° F. and a pressure between about 100 and 1500 psig with a catalyst in the presence of hydrogen, in which the hydrogen-to-feedstock ratio is between about 500 and 8000 standard cubic feet of hydrogen per barrel of feed. The catalyst comprises from about 5 to 60 wt % medium pore zeolite, from about 5 to 60 wt % large pore zeolite, from about 0 to about 50 wt % binder, and from about 0.1 to 2 wt % finely dispersed platinum, wherein the feedstock is contacted with the catalyst in a fixed bed at a liquid hourly space velocity between about 0.5 and 4.

DESCRIPTION OF PREFERRED EMBODIMENTS

The present process may be used to dewax a variety of feedstocks ranging from relatively light distillate fractions up to high boiling stocks, such as whole crude petroleum, reduced crudes, vacuum tower residua, propane deasphalted residua, e.g., brightstock, cycle oils, FCC tower bottoms, gas oils, vacuum gas oils, deasphalted residua and other heavy oils. The feedstock will normally be a $C_{10}+$ feedstock since lighter oils will usually be free of significant quantities of waxy components. However, the process is also particularly useful with waxy distillate stocks, such as gas oils, kerosenes, jet fuels, lubricating oil stocks, heating oils, hydrotreated oil stock, furfural-extracted lubricating oil stock, and other distillate fractions whose pour point and viscosity need to be maintained within certain specification limits. Lubricating oil stocks, for example, will generally boil above 450° F. (230° C.), more easily above 600° F. (315° C.). For purposes of this invention, lubricating or lube oil is that part of a hydrocarbon feedstock having a boiling point of 600° F. (315° C.) or higher, as determined by ASTM D-1160 test method.

In general, hydrodewaxing conditions include a temperature between about 450° F. (230° C.) and about 750° F. (400° C.), a pressure between 0 and about 3000 psig and preferably between about 100 and about 1000 psig. The liquid hourly space velocity (LHSV), i.e., the volume of feedstock per volume of catalyst per hour, is generally between about 0.1 and about 10 and preferably between 0.2 and about 4 and the hydrogen-to-feedstock ratio is generally between about 500 and about 8000 and preferably between about 800 and 4000 standard cubic feet (scf) of hydrogen per barrel of feed.

The catalytic dewaxing process of this invention may be conducted by contacting the feed to be dewaxed with a fixed stationary bed of the defined crystalline silicate zeolite catalysts, a slurry bed or with a transport bed, as desired.

The catalyst used in this process comprises a medium pore zeolite and a large pore crystalline silicate zeolite having a Constraint Index less than 2 and having hydroisomerization activity, e.g., Zeolite Beta, preferably in combination, with a hydrogenating component. Without wishing to be restricted to a certain theory, it is believed that a combination of a medium pore zeolite and a large pore zeolite, in the right proportion will offer superior dewaxing activities and yield lube oils of higher quality than the lube dewaxing catalysts of the prior art.

A portion of the novel class of zeolites useful herein are termed medium or intermediate pore zeolites and have an effective pore size of generally less than about 7 angstroms, such as to freely sorb normal hexane. By "effective pore size" it is meant that the pores of the medium pore zeolite behave in the same fashion as perfectly cylindrical pores, generally less than 7 angstroms in size. Thus, a medium pore zeolite may have pores in excess of 7 angstroms in size as long as the sahpe of the pores renders an effective pore size no greater than 7 angstroms in size. In addition, the structure must provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross-section than normal hexane is excluded and the zeolite is not of the desired type. Windows of 10-membered rings are preferred, although, in some instances, excessive puckering of the rings or pore blockage may render these zeolites ineffective.

Although 12-membered rings in theory would not offer sufficient constraint to produce advantageous conversions, it is noted that the puckered 12-ring structure of TMA offretite does show some constrained access. Other 12-ring structures may exist which may be operative for other reasons, and therefore, it is not the present intention to entirely judge the usefulness of a particular zeolite solely from theoretical structural considerations.

Another class of zeolites important to the present invention, i.e., large pore zeolites, are well known to the art and have a pore size larger than the medium pore zeolites and sufficiently large to admit the vast majority of components normally found in a feed chargestock. These zeolites are generally stated to have a pore size in excess of 7.5 angstroms and are represented by, e.g., zeolite Y, Mordenite, ZSM-4, ZSM-20 and Zeolite Beta.

A convenient measure of the extent to which a zeolite provides control to molecules of varying sizes to its internal structure is the Constraint Index of the zeolite. Zeolites which provide a highly restricted access to and egress from its internal structure have a high value for the Constraint Index, and zeolites of this kind usually have pores of small size. On the other hand, zeolites which provide relatively free access to the internal zeolite structure have a low value for the Constraint Index. The method by which Constraint Index is determined is described fully in U.S. Pat. No. 4,016,218, to which reference is made for details of the method.

Constraint Index (CI) values for some typical materials are:

|  | CI |
| --- | --- |
| ZSM-4 | 0.5 |
| ZSM-5 | 6–8.3 |
| ZSM-11 | 6–8.7 |
| ZSM-12 | 2 |
| ZSM-20 | 0.5 |
| ZSM-23 | 9.1 |
| ZSM-34 | 30–50 |
| ZSM-35 | 4.5 |
| ZSM-38 | 2 |
| ZSM-48 | 3.4 |
| TMA Offretite | 3.7 |
| TEA Mordenite | 0.4 |
| Clinoptilolite | 3.4 |
| Mordenite | 0.5 |
| REY | 0.4 |
| Amorphous Silica-Alumina | 0.6 |
| Dealuminized Y (Deal Y) | 0.5 |
| Chlorinated Alumina | *1 |
| Erionite | 38 |
| Zeolite Beta | 0.6–1+ |

*Less Than

The above-described Constraint Index is an important and even critical definition of those zeolites which are useful in the instant invention. The very nature of this parameter and the recited technique by which it is determined, however, admit of the possibility that a given zeolite can be tested under somewhat different conditions and thereby exhibit different Constraint Indices. Constraint Index seems to vary somewhat with severity of operation (conversion) and the presence or absence of binders. Likewise, other variables, such as crystal size of the zeolite, the presence of occluded contaminants, etc., may affect the Constraint Index. Therefore, it will be appreciated that it may be possible to so select test conditions as to establish more than one value for the Constraint Index of a particular zeolite. This explains the range of Constraint Indices for zeolites, such as ZSM-5, ZSM-11, ZSM-34 and Zeolite Beta.

Zeolite ZSM-4 is taught by U.S. Pat. No. 3,923,639, the disclosure of which is incorporated herein by reference.

Zeolite ZSM-5 is taught by U.S. Pat. Nos. 3,702,886, and Re 29,949, the disclosures of which are incorporated herein by reference.

Zeolite ZSM-11 is taught by U.S. Pat. No. 3,709,979, issued Jan. 9, 1973, the disclosure of which is incorporated herein by reference.

Zeolite ZSM-12 is taught by U.S. Pat. No. 3,832,449, issued Aug. 27, 1974, the disclosure of which is incorporated herein by reference.

Zeolite ZSM-20 is taught by U.S. Pat. No. 3,972,983, the disclosure of which is incorporated herein by reference.

Zeolite ZSM-23 is taught by U.S. Pat. No. 4,076,342, the disclosure of which is incorporated herein by reference.

Zeolite ZSM-34 is described in U.S. Pat. No. 4,086,186, the disclosure of which is incorporated herein by reference.

Zeolite ZSM-35 is described by U.S. Pat. No. 4,016,245, the disclosure of which is incorporated herein by reference.

Zeolite ZSM-38 is described in U.S. Pat. No. 4,046,859, the disclosure of which is incorporated herein by reference.

Zeolite ZSM-48 is described in U.S. Pat. No. 4,397,827, the disclosure of which is incorporated herein by reference.

Zeolite Beta is described in U.S. Pat. Nos. 3,308,069 and Re. 28,341, the entire contents of which are incorporated herein by reference.

The medium or intermediate pore zeolites useful in this invention are described in U.S. Pat. No. 4,401,572, the entire contents of which is incorporated herein by reference. Constraint index (CI) values for typical medium pore zeolites, including those useful herein, are:

| Crystalline Silicate | CI |
|---|---|
| ZSM-5 | 8.3 |
| ZSM-11 | 8.7 |
| ZSM-12 | 2 |
| ZSM-23 | 9.1 |
| ZSM-38 | 2 |
| ZSM-35 | 4.5 |
| ZSM-48 | 3.4 |
| TMA Offretite | 3.7 |

It is to be realized that the above CI values typically characterize the specified zeolites, but that such are the cumulative result of several variables used in determination and calculation thereof. Thus, for a given zeolite exhibiting a CI value within the range of 1 to 12, depending on the temperature employed within the aforenoted range of 550° F. to 950° F., with accompanying conversion between 10% and 60%, the CI may vary within the indicated range of 1 to 12. Likewise, other variables such as the crystal size of the zeolite, the presence of possibly occluded contaminants and binders intimately combined with the zeolite may affect the CI. It will accordingly be understood by those skilled in the art that the CI, as utilized herein, while affording a highly useful means for characterizing the zeolites of interest is approximate, taking into consideration the manner of its determination, with the probability, in some instances, of compounding variable extremes. However, in all instances, at a temperature within the above-specified range of 550° F. of 950° F., the CI will have a value for any given zeolite of interest herein within the approximate range of 1 to 12.

Suitable large pore zeolites include Zeolite Beta, ZSM-4, ZSM-20, Mordenite, TEA Mordenite, Dealuminized Y, and Rare Earth Y (REY), but not crystalline alumina, chlorinated alumina and silica-alumina. Constraint Index values for these materials are:

| | CI |
|---|---|
| ZSM-4 | 0.5 |
| ZSM-20 | 0.5 |
| Mordenite | 0.5 |
| TEA Mordenite | 0.4 |
| Dealuminized Y | 0.5 |
| REY | 0.4 |
| Zeolite Beta | 0.6–1+ |

Additionally, the large pore component may include a low sodium Ultrastable Y molecular sieve (USY). USY is well known to the art and is described in U.S. Pat. Nos. 3,293,192 and 3,449,070.

An exceptionally suitable large pore material is Zeolite Beta. It is to be noted that Zeolite Beta does not have the same structure as the other listed large pore zeolites. However, all of these zeolites provide hydroisomerization activity. The use of the large pore catalysts and Zeolite Beta is a hydroisomerization activity is disclosed in U.S. Pat. Nos. 4,419,220 and 4,428,819, the entire contents of which are incorporated herein by reference. The large pore hydroisomerization catalysts comprise an acidic component and a hydrogenation-dehydrogenation component (referred to, for convenience, as a hydrogenation component) which is generally a metal or metals of Groups IB, IIB, VA, VIA or VIIIA of the Periodic Table (IUPAC and U.S. National Bureau of Standards approved Table, as shown, for example, in the Chart of the Fisher Scientific Company, Catalog No. 5-702-10). The preferred hydrogenation components are the noble metals of Group VIIIA, especially platinum, but other noble metals, such as palladium, gold, silver, rhenium or rhodium, may also be used. Combinations of noble metals, such as platinum-rhenium, platinum-palladium, platinum-iridium or platinum-iridium-rhenium, together with combinations with non-noble metals, particularly of Groups VIA and VIIIA are of interest, particularly with metals such as cobalt, nickel, vanadium, tungsten, titanium and molybdenum, for example, platinum-tungsten, platinum-nickel or platinum-nickel-tungsten. Base metal hydrogenation components may also be used, especially nickel, cobalt, molybdenum, tungsten, copper or zinc. Combinations of base metals, such as cobalt-nickel, cobalt-molybdenum, nickel-tungsten, cobalt-nickel-tungsten or cobalt-nickel-titanium, may also be used.

The metal may be incorporated into the catalyst by any suitable method, such as impregnation or exchange, onto the zeolite. The metal may be incorporated in the form of a cationic, anionic or neutral complex, such as $Pt(NH_3)_4^{2+}$, and cationic complexes of this type will be found convenient for exchanging metals onto the zeolite. Anionic complexes are also useful for impregnating metals into the zeolites.

The acidic component of the zeolite is preferably a porous, crystalline zeolite. The crystalline zeolite catalysts used in the catalyst comprise a three-dimensional lattice of $SiO_4$ tetrahedra, cross-linked by the sharing of oxygen atoms and which may optionally contain other atoms in the lattice, especially aluminum in the form of $AlO_4$ tetrahedra; the zeolite will also include a sufficient cationic complement to balance the negative charge on the lattice. Acidic functionality may, of course, be varied by artifices including base exchange, steaming or control of silica:alumina ratio.

The isomerization reaction is one which requires a relatively small degree of acidic functionality in the catalyst. Because of this, the zeolite may have a very high silica:alumina ratio since this ratio is inversely related to the acid site density of the catalyst. Thus, structural silica:alumina ratios of 50:1 or higher are preferred and, in fact, the ratio may be much higher, e.g., 100:1, 200:1, 500:1, 1000:1, or even higher. Since zeolites are known to retain their acidic functionality even at very high silica:alumina ratios of the order of 25,000:1, ratios of this magnitude or even higher are contemplated.

The original cations associated with each of the crystalline silicate zeolites utilized herein may be replaced by a wide variety of other cations according to techniques well known in the art. Typical replacing cations include hydrogen, ammonium, alkyl ammonium and metal cations, including mixtures of the same. Of the replacing metallic cations, particular reference is given to cations of metals such as rare earth metals, manganese, as well as metals of Group II A and B of the Periodic Table, e.g., zinc, and Group VIII of the Periodic Table, e.g., nickel, platinum and palladium.

Typical ion exchange techniques are to contact the particular zeolite with a salt of the desired replacing cation. Although a wide variety of salts can be employed, particular preference is given to chlorides, nitrates and sulfates.

Representative ion exchange techniques are disclosed in a wide variety of patents, including U.S. Pat. Nos. 3,140,249; 3,140,251; and 3,140,253.

Following contact with a solution of the desired replacing cation, the zeolite is then preferably washed with water and dried at a temperature ranging from 150° F. to about 600° F. and thereafter calcined in air, or other inert gas at temperatures ranging from about 500° F. to 1500° F. for periods of time ranging from 1 to 48 hours or more. It has been further found that catalysts of improved selectivity and other beneficial properties may be obtained by subjecting the zeolite to treatment with steam at elevated temperatures ranging from 500° F. to 1200° F. and preferably 750° F. to 1000° F. The treatment may be accomplished in an atmosphere of 100% steam or an atmosphere consisting of steam and a gas which is substantially inert to the zeolites.

A similar treatment can be accomplished at lower temperatures and elevated pressure, e.g., 350°–700° C. at 10 to about 200 atmospheres. The crystalline silicate zeolite utilized in the process of this invention is desirably employed in intimate combination with one or more hydrogenation components, such as tungsten, vanadium, zinc, molybdenum, rhenium, nickel, cobalt, chromium, manganese, or a noble metal such as platinum or palladium, in an amount between about 0.1 and about 25% by weight, normally 0.1 to 5% by weight especially for noble metals, and preferably 0.3 to 1% by weight. Such component can be exchanged into the composition, impregnated thereon or physically intimately admixed therewith. Such component can be impregnated into or onto the zeolite, such as, for example, in the case of platinum, by treating the zeolite with a platinum metal-containing ion. Thus, suitable platinum compounds include chloroplatinic acid, platinous chloride and various compounds containing the platinum amine complex.

The compounds of the useful platinum or other metals can be divided into compounds in which the metal is present in the cation of the compound and compounds in which it is present in the anion of the compound. Both types of compounds which contain the metal in the ionic state can be used. A solution in which platinum metals are in the form of a cation or cationic complex, e.g., $Pt(NH_3)_4Cl_2$, is particularly useful.

Prior to use, the zeolites should be dehydrated at least partially. This can be done by heating to a temperature in the range of 200° to 600° C. in an inert atmosphere, such as air, nitrogen, etc., and at atmospheric or subatmospheric pressures for between 1 and 48 hours. Dehydration can also be performed at lower temperatures merely by using a vacuum, but a longer time is required to obtain sufficient amount of dehydration.

A preferred method for preparing the catalyst is to blend the zeolite with an inorganic oxide, such as alumina hydrates, form the composite into extrudates, dry the extrudate and calcine in an atmosphere such as nitrogen or air. The extrudate may then be exchanged with cations, such as ammonium, and recalcined, prior to adding a hydrogenation component, such as metals of Groups VI, VII, and VIII of the Periodic Table, e.g., platinum, molybdenum, nickel and cobalt. The addition of the hydrogenation compound may be accomplished by impregnation and ion exchange. Drying and calcining subsequent to the addition of the hydrogenation component is then used to complete the preparation.

While it is understood that the process of the present invention may be accomplished by utilizing a catalyst incorporating any of the previously-mentioned large pore catalysts, the preparation and process of using the novel catalyst of the present invention will be exemplified using Zeolite Beta as the large pore catalyst.

The catalysts of this invention are typically prepared by mulling together from about 5 to 60% by weight, preferably 20 to 40% by weight medium pore zeolite ($SiO_2/Al_2O_3$ mole ratio of 70), from about 5 to 60% by weight, preferably 20 to 40% by weight large pore zeolite, e.g., $NH_4$ Zeolite Beta ($SiO_2/Al_2O_3$ mole ratio of 30), and from 0 to about 50% by weight, preferably 0 to 40% by weight binder alpha alumina monohydrate. The ratio of the Zeolite Beta to the medium pore zeolite should be no greater than 1. During the mulling process, a sufficient amount of water containing $H_2PtCl_6$ or $Pt(NH_3)_4(NO_3)_2$ is added slowly to the dry mulling mixture. The mulling process is continued for about 20 minutes or until the mixture is uniform. The mixture is then extruded and dried at 230° F. for approximately 3 hours. The extrudates are crushed and sized to 30/60 mesh material and calcined in air at 1000° F. for 3 hours. The catalyst thus produced contains from about 0.1 to 2% by weight, preferably 0.3 to 1% by weight of finely dispersed platinum. It is to be understood that metal cations other than platinum may be incorporated into the catalyst.

The following examples will serve to illustrate the process of the invention without limiting the same.

EXAMPLES 1–9

In Examples 1–9, the chargestock was a light neutral lubricating oil chargestock having the following properties:

| | |
|---|---|
| Specific Gravity | .8774 |
| API° | 29.8 |
| Pour Point | 85° F. |
| Cloud Point | 120° F. |
| Viscosity KV at 100° C. | 5.341 |
| Sulfur | 0.76 wt. % |
| ASTM Color | *L1.0 |

*L = Less Than

EXAMPLES 1–2

Examples 1 and 2 illustrate the effect of unsteamed Ni-ZSM-5 catalyst on the chargestock as it was passed over the catalyst. The catalyst was loaded into a fixed-bed reactor. After the reactor temperature was lowered to the desired setting, the chargestock was passed over the catalyst along with hydrogen under the controlled process conditions which are recited in Table 1. The product stream leaving the reactor was passed through a heated trap, a cold-water trap, and a gas-sampling bomb. The gas samples were analyzed by mass spectrometry for $C_1$–$C_6$ components. Liquid products were topped under less than 0.1 mm Hg pressure and maximum pot temperature of 400° F., to isolate the 650° F. fraction. Some of the topped samples were processed through a simulated distillator. The light liquid products, i.e., the condensate from the cold trap and the overhead from the topped samples, were analyzed by gas chromatography. Overall material balances were made based on total liquid feed charge plus hydrogen. The results are also recited in Table 1.

TABLE 1

| Example No. | 1 | 2 |
|---|---|---|
| Temperature, °F. | 550 | 580 |
| Pressure, psig | 400 | 400 |
| Gas | $H_2$ | $H_2$ |
| Circulation, SCF/bbl | 2500 | 2404 |
| Time on Stream, days | 1 | 5 |
| Run Time, hours | 21 | 26 |
| LHSV, v/v/hr | 1.00 | 1.04 |
| Material Balance, % | 98.3 | 97.5 |
| Yields, Wt % | | |
| $C_1 + C_2$ | 0.25 | 0.48 |
| $C_3$ | 4.96 | 3.59 |
| $C_4$ | 6.10 | 3.82 |
| $C_5$ | 1.49 | 2.44 |
| $C_6$—650° F. | 6.61 | 8.40 |
| 650° F.+ Lube | 80.59 | 81.27 |
| Specific Gravity | .8878 | .8857 |
| API° | 27.9 | 28.3 |
| Pour Point, °F. | 5 | 0 |
| Cloud Point, °F.* | 22 | 18 |
| KV at 100° F. | 58.43 | 50.35 |
| KV at 210° F. | 7.346 | 6.673 |
| KV at 40° C. | 52.42 | 45.29 |
| KV at 100° C. | 7.162 | 6.510 |
| SUS at 100° F. | 271 | 234 |
| SUS at 210° F. | 50.2 | 48.1 |
| Viscosity Index | 93.2 | 91.7 |
| Sulfur, Wt % | 0.98 | 0.93 |
| Overnight Cloud (ONC)** | 17 | 8 |
| ASTM Color*** | 3.0 | L1.5 |

*ASTM D-2500
**See Footnote Page 30
***For ASTM Color: L = lighter than, and D = darker than

EXAMPLES 3–4

Examples 3 and 4 illustrate the effect of steamed Ni-ZSM-5 catalyst on the chargestock. The procedure of Examples 1–2 was followed under conditions specified in Table 2, which also recites the results.

TABLE 2

| Example No. | 3 | 4 |
|---|---|---|
| Temperature, °F. | 580 | 580 |
| Pressure, psig | 400 | 400 |
| Gas | $H_2$ | $H_2$ |
| Circulation, SCF/bbl | 2679 | 2242 |
| LHSV, v/v/hr | 1.00 | 1.02 |
| Yields, Wt % | | |
| $C_1 + C_2$ | 0.11 | 0.02 |
| $C_3$ | 1.49 | 1.69 |
| $C_4$ | 4.03 | 3.87 |
| $C_5$ | 4.25 | 7.81 |
| $C_6$—650° F. | 10.84 | 9.13 |
| 650° F.+ Lube | 79.49 (610° F.) | 77.67 (610° F.) |
| Specific Gravity | .8838 | .8805 |
| API° | 28.6 | 29.2 |
| Pour Point, °F. | 15 | 45 |
| KV at 100° F. | 47.72 | 46.30 |
| KV at 210° F. | 6.482 | 6.402 |
| KV at 40° C. | 42.99 | 41.75 |
| KV at 100° C. | 6.325 | 6.248 |
| SUS at 100° F. | 222 | 216 |
| SUS at 210° F. | 47.2 | 46.9 |
| Viscosity Index | 92.8 | 94.9 |
| Sulfur, Wt % | 0.80 | 0.84 |
| Overnight Cloud | Fail | Fail |

EXAMPLE 5–6

Examples 5 and 6 illustrate the effect of a 0.5% Pt-ZSM-5 catalyst on the chargestock. The platinum catalyst was reduced in situ at 900° F. and 400 psig of hydrogen for one hour before introducing the feed into the reactor. The procedure of Examples 1–2 was followed under conditions specified in Table 3, which also recites the results.

TABLE 3

| Example No. | 5 | 6 |
|---|---|---|
| Temperature, °F. | 565 | 565 |
| Pressure, psig | 400 | 400 |
| Gas | $H_2$ | $H_2$ |
| Circulation, SCF/bbl | 2053 | 2493 |
| Time on Stream, days | 3 | 4 |
| Run Time, hours | 22 | 25 |
| LHSV, v/v/hr | 1.28 | 1.00 |
| Material Balance, % | 97.6 | 97.4 |
| Yields, Wt % | | |
| $C_1 + C_2$ | 0.24 | 0.46 |
| $C_3$ | 4.44 | 4.59 |
| $C_4$ | 5.41 | 4.93 |
| $C_5$ | 1.51 | 2.66 |
| $C_6$—650° F. | 8.75 | 8.80 |
| 650° F.+ Lube | 80.65 | 78.56 |
| Specific Gravity | .8854 | .8868 |
| API° | 28.3 | 28.1 |
| Pour Point, °F. | 5 | −10 |
| Cloud Point, °F. | 8 | 0 |
| KV at 100° F. | 50.42 | 51.90 |
| KV at 210° F. | 6.673 | 6.736 |
| KV at 40° C. | 45.35 | 46.63 |
| KV at 100° C. | 6.505 | 6.569 |
| SUS at 100° F. | 234 | 241 |
| SUS at 210° F. | 48.1 | 48.3 |
| Viscosity Index | 91.5 | 89.1 |
| Sulfur, Wt % | .91 | 0.92 |
| Overnight Cloud | 2 | 2 |
| ASTM Color | 0.5 | 0.5 |

EXAMPLES 7–9

Examples 7–9 illustrate the effect of 0.44% Pt-ZSM-5/Zeolite Beta on the chargestock. The composition of the catalyst is as follows:

| Component | Wt. % |
|---|---|
| $NH_4$ ZSM-5 | 32.5 |
| $NH_4$ Zeolite Beta | 32.5 |
| Alpha Alumina Monohydrate (binder) | 35 |
| Platinum | .44 |

The procedure of Examples 5–6 was followed under conditions specified in Table 4, which also recites the results.

TABLE 4

| Example No. | 7 | 8 | 9 |
|---|---|---|---|
| Temperature, °F. | 550 | 565 | 580 |
| Pressure, psig | 400 | 400 | 400 |
| Gas | $H_2$ | $H_2$ | $H_2$ |
| Circulation, SCF/bbl | 2272 | 2523 | 2515 |
| Time on Stream, days | 1 | 2 | 3 |
| Run Time, hours | 23 | 22½ | 22½ |
| LHSV, v/v/hr | 1.1 | .99 | .99 |
| Material Balance, % | 100.5 | 98.3 | 97.0 |
| Yields, Wt % | | | |
| $C_1 + C_2$ | 0.17 | 0.31 | 0.36 |
| $C_3$ | 1.03 | 1.64 | 1.95 |
| $C_4$ | 2.55 | 3.26 | 2.09 |
| $C_5$ | 2.29 | 2.63 | 2.57 |
| $C_6$—650° F. | 8.30 | 7.37 | 7.61 |
| 650° F.+ Lube | 85.66 | 84.79 | 85.42 |
| Specific Gravity | .8815 | .8823 | .8836 |
| API° | 29.0 | 28.9 | 28.6 |
| Pour Point, °F. | 45 | 20 | 5 |

TABLE 4-continued

| Example No. | 7 | 8 | 9 |
|---|---|---|---|
| Cloud Point, °F. | NA | 30 | 20 |
| KV at 100° F. | 48.81 | 47.05 | 48.22 |
| KV at 210° F. | 6.764 | 6.519 | 6.586 |
| KV at 40° C. | 44.04 | 42.44 | 43.46 |
| KV at 100° C. | 6.601 | 6.363 | 6.427 |
| SUS at 100° F. | 227 | 219 | 224 |
| SUS at 210° F. | 48.3 | 47.6 | 47.8 |
| Viscosity Index | 100.9 | 97.0 | 95.5 |
| Sulfur, Wt % | 0.87 | 0.88 | 0.90 |
| Overnight Cloud | NA | NA | 3 |
| ASTM Color | L1.0 | L1.0 | L1.0 |

NA - Not Applicable

The results of Examples 1–9 are summarized below in Table 5, based upon data at 5° F. pour point for unsteamed Ni-ZSM-5, Pt-ZSM-5, and Pt-ZSM-5/Zeolite Beta catalysts (Examples 1, 5 and 9) and 15° F. pour point for steamed NiZSM-5 (Example 3).

TABLE 5

| Catalyst | Pt-ZSM-5/ Zeolite Beta | Pt-ZSM-5 | Unsteamed Ni-ZSM-5 | Steamed Ni-ZSM-5 |
|---|---|---|---|---|
| Metal, Wt % | 0.44% Pt | 0.5% Pt | 1.2% Ni | 1.2% Ni |
| Pour Point, °F. | 5 | 5 | 5 | 15 |
| VI | 95.5 | 91.5 | 93.2 | 92.8 |
| Lube Yield, Wt % | 85.4 | 80.7 | 80.6 | 79.5* |
| Overnight Cloud | 3 | 2 | 17 | Fail |

*Based on 610° F. cut

The results of Examples 1–9 demonstrate:

(1) For the 650° F.+ pour point yield, Pt-ZSM-5/Zeolite Beta yields approximately a 5wt % improvement over Pt-ZSM-5, steamed NI-ZSM-5 or unsteamed Ni-ZSM-5;

(2) Pt-ZSM-5/Zeolite Beta improved viscosity index of the dewaxed product by approximately four numbers*;

*The data for steamed Ni-ZSM-5 can be correlated to 5° F. pour point based on one number in VI for each 5° F. pour point decrease. Thus, the product processed with steamed Ni-ZSM-5 would have a VI of 90.8 at 5° F. pour.

and (3) Compared to unsteamed Ni-ZSM-5, either Pt-ZSM-5/Zeolite Beta or Pt-ZSM-5 improved overnight cloud (ONC) performance substantially. The products from these platinum catalysts clearly passed the ONC test.*

*ONC was determined by a standard Nephalometric instrument. The instrument measured the cloud produced after sample were maintained stationary for at least 16 hours at 30° F. A product with ONC less than 10 passes the test.

Thus, the catalyst of the present invention is superior to prior art dewaxing catalysts in viscosity index, lubricating oil yield and overnight cloud performance. Additionally, the catalyst of the present invention is substantially more active than the currently-used dewaxing catalyst: steamed Ni-ZSM-5.

EXAMPLES 10-20

In the following examples, the chargestock used was a light neutral lubricating oil chargestock having the following properties:

| | Light Neutral Stock |
|---|---|
| Specific Gravity | 0.8774 |
| API° | 29.8 |
| Pour Point, °F. | 85 |
| Cloud Point, °F. | #120 |
| Viscosity KV at 100° C. | 5.341 |
| Sulfur, Wt. % | 0.76 |
| Basic Nitrogen, ppm | 45 |
| Hydrogen, Wt. % | 13.7 |
| ASTM Color | L1.0 |

# = Greater Than

EXAMPLES 10-12

Examples 10–12 illustrate the effect of unsteamed 0.1% Pt-Zeolite Beta on the light neutral chargestock. The procedure of Examples 5–6 was followed under conditions specified in Table 6, which also recites the results.

TABLE 6

| Example No. | 10 | 11 | 12 |
|---|---|---|---|
| Temperature, °F. | 580 | 650 | 750 |
| Pressure, psig | 400 | 400 | 400 |
| Gas | H$_2$ | H$_2$ | H$_2$ |
| Circulation, SCF/bbl | 1818 | 2344 | 2533 |
| Time on Stream, days | 2 | 3 | 4 |
| Run Time, hours | 24 | 24 | 18 |
| LHSV, v/v/hr | 1.21 | 1.09 | 0.99 |
| Material Balance, % | 100.8 | 99.9 | 97.0 |
| Yields, Wt % | | | |
| C$_1$ + C$_2$ | 0.1 | 0.1 | 0.1 |
| C$_3$ | 0.2 | 0.3 | 0.3 |
| C$_4$ | 0.6 | 0.7 | 2.2 |
| C$_5$ | 0.8 | 0.7 | 1.7 |
| C$_6$—650° F. | 0.9 | 1.6 | 14.1 |
| 650° F.+ Lube | 97.4 | 96.6 | 81.6 |
| Specific Gravity | .8764 | .8752 | .8764 |
| API° | 30.0 | 30.2 | 30.0 |
| Pour Point, °F. | 95 | 85 | 80 |
| Cloud Point, °F. | 118 | #120 | #120 |
| KV at 100° F. | 34.74 | 34.89 | 35.33 |
| KV at 210° F. | 5.491 | 5.837 | 5.563 |
| KV at 40° C. | 31.57 | 31.83 | 32.10 |
| KV at 100° C. | 5.367 | 5.708 | 5.437 |
| SUS at 100° F. | 162.9 | 163.5 | 165.5 |
| SUS at 210° F. | 44.2 | 45.4 | 44.5 |
| Viscosity Index | 102.9 | 120.9 | 103.7 |
| Sulfur, Wt % | 0.75 | 0.74 | 0.54 |
| Basic Nitrogen, ppm | 29.4 | 32.9 | 12.6 |
| Hydrogen, Wt. % | 14.05 | 13.77 | 13.76 |
| Overnight Cloud | NA | NA | 0 |
| ASTM Color | L2.0 | L1.5 | L3.0 |

Greater Than

EXAMPLES 13-16

Examples 13–16 illustrate the effect of 0.5% Pt-Zeolite Beta on the light neutral chargestock. The procedure of Examples 5–6 was followed under conditions specified in Table 7, which also recites the results.

TABLE 7

| Example No. | 13 | 14 | 15 | 16 |
|---|---|---|---|---|
| Temperature, °F. | 580 | 650 | 750 | 800 |
| Pressure, psig | 400 | 400 | 400 | 400 |
| Gas | H$_2$ | H$_2$ | H$_2$ | H$_2$ |
| Circulation, SCF/bbl | 2481 | 2426 | 2628 | 2490 |
| Time on Stream, days | 1 | 2 | 4 | 6 |
| Run Time, hours | 23 | 21 | 68 | 19 |
| LHSV, v/v/hr | 1.03 | 1.04 | 1.12 | 1.01 |
| Material Balance, % | 95.0 | 100.0 | 95.6 | 94.0 |
| Yields, Wt % | | | | |
| C$_1$ + C$_2$ | 0 | 0.2 | 0.1 | 1.0 |
| C$_3$ | 0 | 0 | 1.2 | 2.1 |
| C$_4$ | 0.2 | 1.6 | 3.4 | 6.1 |
| C$_5$ | 0 | 1.9 | 2.5 | 3.3 |

TABLE 7-continued

| Example No. | 13 | 14 | 15 | 16 |
|---|---|---|---|---|
| $C_6$—650° F. | 8.8 | 6.2 | 13.6 | 35.0 |
| 650° F.+ Lube | 91.0 | 90.1 | 79.2 | 52.5 |
| Specific Gravity | 0.8787 | 0.8763 | 0.8737 | 0.8814 |
| API° | 29.5 | 30.5 | 30.5 | 29.0 |
| Pour Point, °F. | 90 | 85 | 85 | 5 |
| Cloud Point, °F. | 120 | NA | 106 | 64 |
| KV at 100° F. | 38.97 | 37.80 | 33.58 | 14.11 |
| KV at 210° F. | 6.037 | 5.892 | 5.404 | 3.093 |
| KV at 40° C. | 35.38 | 34.33 | 30.54 | 13.05 |
| KV at 100° C. | 5.899 | 5.748 | 5.283 | 3.035 |
| SUS at 100° F. | 182 | 176.7 | 157.6 | 73.9 |
| SUS at 210° F. | 46.0 | 45.5 | 44 | 36.5 |
| Viscosity Index | 109.5 | 18.2 | 104.4 | 80.5 |
| Sulfur, Wt % | 0.69 | 0.58 | 0.305 | 0.220 |
| Basic Nitrogen, ppm | 13.4 | 17.4 | 12.2 | #5 |
| Hydrogen, Wt. % | 13.61 | 13.66 | 13.76 | 13.06 |
| Overnight Cloud | Fail | Fail | Fail | Fail |
| ASTM Color | 2.5 | L1.5 | L3.5 | 4.0 |

EXAMPLES 17-20

Examples 17-20 illustrate the effect of unsteamed 1.1% Ni-ZSM-5/Zeolite Beta on the light neutral chargestock. The procedure of Examples 1-2 was followed under conditions specified in Table 8, which also recites the results.

TABLE 8

| Example No. | 17 | 18 | 19 | 20 |
|---|---|---|---|---|
| Temperature, °F. | 565 | 575 | 600 | 625 |
| Pressure, psig | 400 | 400 | 400 | 400 |
| Gas | $H_2$ | $H_2$ | $H_2$ | $H_2$ |
| Circulation, SCF/bbl | 2496 | 2656 | 2489 | 2586 |
| Time on Stream, days | 2 | 3 | 5 | 7 |
| Run Time, hours | 23 | 24 | 66 | 24 |
| LHSV, v/v/hr | 1.02 | 1.00 | 1.05 | 1.02 |
| Material Balance, % | 99.6 | 100.2 | 102.4 | 98.6 |
| Yields, Wt % | | | | |
| $C_1 + C_2$ | 0.3 | 0.3 | 0.4 | 0.4 |
| $C_3$ | 1.4 | 1.3 | 2.3 | 2.3 |
| $C_4$ | 3.0 | 3.5 | 3.7 | 3.8 |
| $C_5$ | 2.2 | 2.7 | 2.9 | 2.9 |
| $C_6$—650° F. | 7.6 | 7.9 | 8.3 | 9.1 |
| 650° F.+ Lube | 84.7 | 84.3 | 82.4 | 81.5 |
| Specific Gravity | 0.8809 | 0.8819 | 0.8836 | 0.8849 |
| API° | 29.1 | 28.9 | 28.6 | 28.4 |
| Pour Point, °F. | 45 | 35 | 15 | 0 |
| Cloud Point, °F. | 56 | 44 | 26 | 0 |
| KV at 100° F. | 45.25 | 46.27 | 47.72 | 50.02 |
| KV at 210° F. | 6.410 | 6.467 | 6.524 | 6.633 |
| KV at 40° F. | 40.868 | 41.76 | 43.01 | 45.00 |
| KV at 100° F. | 6.258 | 6.312 | 6.367 | 6.471 |
| SUS at 100° F. | 211 | 215 | 222 | 233 |
| SUS at 210° F. | 47.2 | 47.4 | 47.6 | 47.9 |
| Viscosity Index | 99.4 | 97.8 | 94.7 | 91.0 |
| Sulfur, Wt % | 0.90 | 0.92 | 0.91 | 0.91 |
| Basic Nitrogen, ppm | 35 | 32 | 33 | 37 |
| Hydrogen, Wt. % | 13.66 | 13.38 | 13.67 | 13.56 |
| Overnight Cloud | Fail | Fail | Fail | 2 |
| ASTM Color | L1.0 | L1.0 | L1.5 | |

EXAMPLES 21-25

Examples 21-25 illustrate the effect of 0.5% Pt-ZSM-11/Zeolite Beta on the light neutral chargestock. For these examples, ZSM-11 was first calcined in a nitrogen atmosphere at 1000° F. for 3 hours to decompose tetrabutyl ammonium and other organics in its structure. The ZSM-11 was subsequently $NH_4NO_3$ exchanged to reduce its Na content to less than 0.02%. Zeolite Beta was pretreated in a similar procedure as ZSM-11. 32.5 parts of $NH_4ZSM$-11, 32.5 parts of $NH_4$ Zeolite Beta and 35 parts of alpha alumina monohydrate were mulled together to form a uniform mixture which was then impregnated with $H_2PtCl_6$ in a stream of $CO_2$. The sample was finally sized to 30/60 mesh and activated with an air calcination for 3 hours at 1000° F. The sample was analyzed and found to contain 0.49 wt % and 0.01 wt % Na.

The runs were made in a 15/32" ID fixed-bed reactor with a spiral preheater and a three-zone furnace for good temperature control. The platinum composite catalyst was reduced in situ at 900° F. and 400 psig of hydrogen for one hour before the reactor temperature was lowered to 500° F. and the feed was started pumping into the reactor. The product stream leaving the reactor was passed through a heated trap, a cold water trap, and a gas-sampling bomb. The gas samples were analyzed by mass spectrometry for $C_1$-$C_6$ components. Liquid products were topped under less than 0.1 mm Hg pressure, maximum pot temperature 400° F., to isolate the 650° F.+ part. Light liquid products (the condensate in the cold trap and the overhead from topping) were sent for gas chromatography analysis. Overall material balances were made based on total liquid feed charge plus hydrogen. Fresh catalyst was used for each run.

The run conditions and results are specified in Table 9.

TABLE 9

| Example No. | 21 | 22 | 23 | 24 | 25 |
|---|---|---|---|---|---|
| Temperature, °F. | 570 | 570 | 580 | 590 | 600 |
| Pressure, psig | 400 | 400 | 400 | 400 | 400 |
| Gas | $H_2$ | $H_2$ | $H_2$ | $H_2$ | $H_2$ |
| Circulation, SCF/bbl | 1934 | 2548 | 2588 | 2434 | 2420 |
| Time on Stream, days | 1.5 | 4 | 5.5 | 6.5 | 7.5 |
| Run Time, hours | 64 | 22 | 22 | 20 | 19.5 |
| LHSV, v/v/hr | 1.01 | 0.98 | 0.98 | 1.05 | 1.03 |
| Material Balance, % | 98.1 | 100.7 | 103.5 | 99.9 | 102.0 |
| Yields, Wt % | | | | | |
| $C_1 + C_2$ | 0.1 | 0.3 | 0.1 | 0.2 | 0.3 |
| $C_3$ | 2.3 | 1.4 | 2.6 | 1.7 | 3.2 |
| $C_4$ | 2.1 | 2.5 | 2.9 | 3.3 | 3.1 |
| $C_5$ | 2.8 | 2.7 | 2.8 | 2.8 | 2.1 |
| $C_6$—650° F. | 9.8 | 8.1 | 7.3 | 7.9 | 8.3 |
| 650° F.+ Lube | 82.9 | 85.0 | 84.3 | 85.1 | 83.0 |
| Specific Gravity | 0.8844 | 0.8800 | 0.8810 | 0.8820 | 0.8830 |
| API° | 28.5 | 29.3 | 29.1 | 28.9 | 28.8 |
| Pour Point, °F. | 10 | 35 | 20 | 15 | 5 |
| Cloud Point, °F. | 20 | 44 | 40 | 26 | 10 |
| KV at 100° F. | 51.17 | 44.90 | 45.49 | 46.57 | 47.49 |
| KV at 210° F. | 6.765 | 6.389 | 6.388 | 6.449 | 6.496 |
| KV at 40° C. | 46.03 | 40.56 | 41.06 | 42.00 | 42.80 |
| KV at 100° C. | 6.599 | 6.237 | 6.236 | 6.294 | 6.339 |
| SUS at 100° F. | 238 | 209 | 212 | 217 | 221 |
| SUS at 210° F. | 48.3 | 47.1 | 47.1 | 47.3 | 47.5 |
| Viscosity Index | 92.8 | 99.8 | 97.5 | 95.8 | 94.3 |
| Sulfur, Wt % | 0.88 | 0.87 | 0.85 | 0.88 | 0.85 |
| Basic Nitrogen, ppm | 15 | 33 | 34 | 37 | 40 |
| Hydrogen, Wt. % | 13.61 | 13.58 | 13.60 | 13.61 | 13.43 |
| Overnight Cloud | 0 | Fail | Fail | 23 | 6 |
| ASTM Color | L1.0 | L1.0 | L1.0 | L1.0 | L1.0 |

EXAMPLES 26-29

Examples 26-29 illustrate the effect of 0.5% Pt-ZSM-23/Zeolite Beta on the light neutral chargestock. The composite catalyst of Zeolite Beta and ZSM-23 was prepared by combining 32.5 parts of Zeolite Beta, 32.5 parts of ZSM-23 and 35 parts of alpha alumina monohydrate. The mixture was mulled together with water added to about 50% in solids content. After 30 minutes, the mix was dried, formed, and sized to 14/25 mesh. The sample was then impregnated with $H_2PtCl_6$ solution in a stream of $CO_2$. The air calcined final sample (at 1000° F., 3 hours) was analyzed and found to contain 0.53% weight Pt and 0.02% weight Na.

The samples were tested using the procedure outlined for Examples 21-25. The run conditions and results are specified in Table 10.

TABLE 10

| Example No. | 26 | 27 | 28 | 29 |
|---|---|---|---|---|
| Temperature, °F. | 598 | 624 | 670 | 680 |
| Pressure, psig | 400 | 400 | 400 | 400 |
| Gas | $H_2$ | $H_2$ | $H_2$ | $H_2$ |
| Circulation, SCF/bbl | 2563 | 2569 | 2513 | 2653 |
| Time on Stream, days | 1 | 2 | 4.5 | 7 |
| Run Time, hours | 20 | 23 | 89 | 18.5 |
| LHSV, v/v/hr | 0.99 | 1.00 | 1.00 | 0.95 |
| Material Balance, % | 96.0 | 96.9 | 96.4 | 100.0 |
| Yields, Wt % | | | | |
| $C_1 + C_2$ | 0.3 | 0.3 | 0.3 | 0.4 |
| $C_3$ | 1.6 | 1.5 | 2.1 | 2.7 |
| $C_4$ | 3.2 | 2.7 | 3.4 | 4.0 |
| $C_5$ | 3.2 | 2.8 | 2.9 | 2.8 |
| $C_6$—650° F. | 14.4 | 6.0 | 6.7 | 6.6 |
| 650° F.+ Lube | 77.3 | 85.7 | 84.6 | 83.5 |
| Specific Gravity | .8771 | .8750 | 0.8761 | .8754 |
| API° | 29.8 | 30.2 | 30.0 | 30.1 |
| Pour Point, °F. | 60 | 55 | 25 | 25 |
| Cloud Point, °F. | 76 | 68 | 34 | 22 |
| KV at 100° F. | 40.58 | 41.16 | 43.56 | 42.93 |
| KV at 210° F. | 6.074 | 6.146 | 6.276 | 6.231 |
| KV at 40° C. | 36.77 | 37.29 | 39.376 | 38.83 |
| KV at 100° C. | 5.933 | 6.003 | 6.128 | 6.084 |
| SUS at 100° F. | 189.4 | 192 | 203 | 200 |
| SUS at 210° F. | 46.1 | 46.3 | 46.8 | 46.6 |
| Viscosity Index | 103.9 | 104.6 | 100.4 | 100.9 |
| Sulfur, Wt % | 0.495 | 0.480 | 0.315 | 0.265 |
| Basic Nitrogen, ppm | 19.1 | 25.7 | 27 | 26 |
| Hydrogen, Wt. % | 13.62 | 13.86 | 13.84 | 12.95 |
| ASTM Color | L1.5 | L1.0 | L1.0 | L1.0 |

Figure 1:
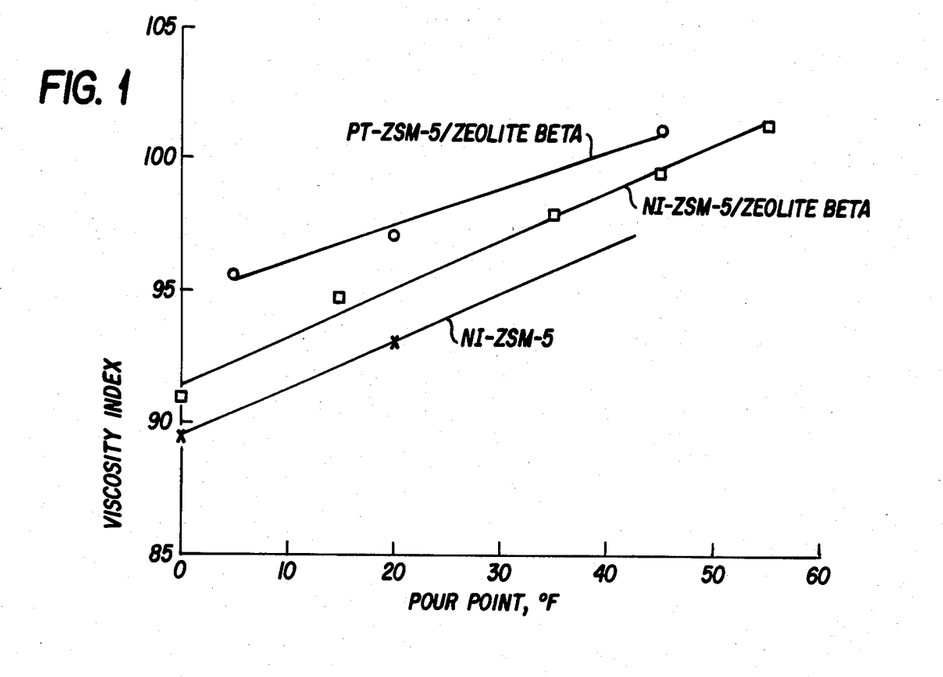
FIG. 1 shows a comparison of viscosity index and pour point for Pt-ZSM-5/Zeolite Beta, Ni-ZSM-5/Zeolite Beta or Ni-ZSM-5 on a light neutral chargestock.
Figure 2:
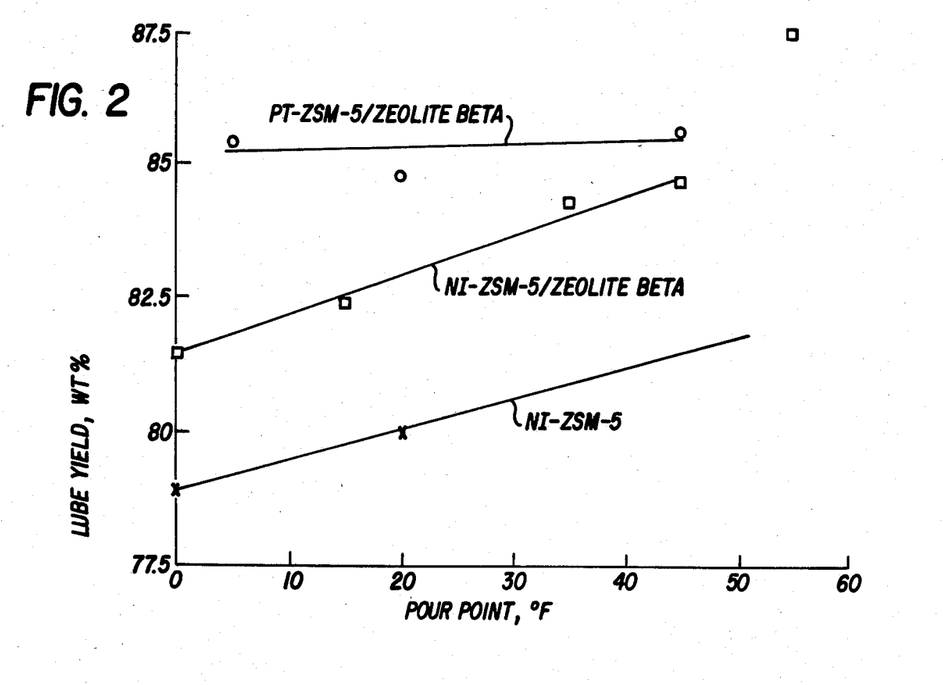
FIG. 2 shows a comparison of lube yield and pour point for Pt-ZSM-5/Zeolite Beta, Ni-ZSM-5/Zeolite Beta or Ni-ZSM-5 on a light neutral chargestock.

The results indicate that Pt-ZSM-5/Zeolite Beta, Ni-ZSM-5/Zeolite Beta, Pt-ZSM-11/Zeolite Beta and Pt-ZSM-23/Zeolite Beta are catalysts superior in V.I. and lube yield to the steamed Ni-ZSM-5 catalyst, the catalyst currently commonly used in lube dewaxing. FIGS. 1 and 2 depict the relationships of V.I. and lube yield versus pour point for Pt-ZSM-5/Zeolite Beta and Ni-ZSM-5/Zeolite Beta. Generally, Pt-ZSM-5/Zeolite Beta improved V.I. by 3-5 numbers and lube yields by 4-6 wt. % over steamed Ni-ZSM-5. Ni-ZSM-5/Zeolite Beta also improved V.I. and lube yield over steamed Ni-ZSM-5 by 1-2 numbers and 2-3 wt. % respectively. Pt-ZSM-5/Zeolite Beta had constant lube yields over a pour point range of 5°-45° F. With regard to Ni-ZSM-5, lube yield generally declined with decreasing pour point.

Pt-ZSM-5/Zeolite Beta also reduces overnight cloud (ONC) formation in the light neutral stock. At 5° F., the product processed over this catalyst passed the ONC test, while the products from the steamed Ni-ZSM-5 catalyst failed.

Additionally, both Pt- and Ni-ZSM-5/Zeolite Beta catalysts produce a lube stock with higher sulfur and lower nitrogen contents than the standard steamed Ni-ZSM-5 catalyst. The quality of the lube stock is generally enhanced by higher sulfur and lower nitrogen contents.

Further, Pt-ZSM-5/Zeolite Beta reduces the ASTM color of dewaxed products. At 5° F., the ASTM color of the lube stock is L1.0 for Pt-ZSM-5/Zeolite Beta and 3.0 for unsteamed Ni-ZSM-5. Pt-ZSM-5/Zeolite Beta also yields less $C_3$-$C_5$ gaseous products than steamed Ni-ZSM-5, indicating that the Pt composite catalyst has less undesired cracking activity.

With respect of the Zeolite Beta catalysts tested (0.1 and 0.5 wt. % Pt), the figures in Tables 7 and 8 indicate that the higher platinum content, i.e., 0.5 wt. %, slightly increased catalytic cracking activity. This is shown by the lower lube yields when the lube stock is processed over 0.5 wt. % Pt-Zeolite Beta. At 750° pour point, the lube yields, specific gravities and viscosity indexes were comparable for 0.1 and 0.5 wt. % Pt-Zeolite Beta catalysts. However, compared to either of the Pt-ZSM-5/Zeolite Beta catalysts, Pt-Zeolite Beta has a lube dewaxing activity disadvantage of at least 200° F. As indicated on Table 4, a reactor temperature of about 580° F. is required to yield a 5° F. pour product, with unsteamed 0.45% Pt-ZSM-5/Zeolite Beta. However, a reactor temperature of 800° F. is needed for 0.44% Pt-Zeolite Beta (Table 7). Additionally, at 800° F., Pt-Zeolite Beta severely reduces the viscosities of the dewaxed product, resulting in a V.I. of only 80.5. The product lube stock from Pt-Zeolite Beta also has a darker ASTM color (4.0—Table 7) than the lube stocks treated with either Pt-ZSM-5/Zeolite Beta (L1.0—Table 9).

Figure 3:
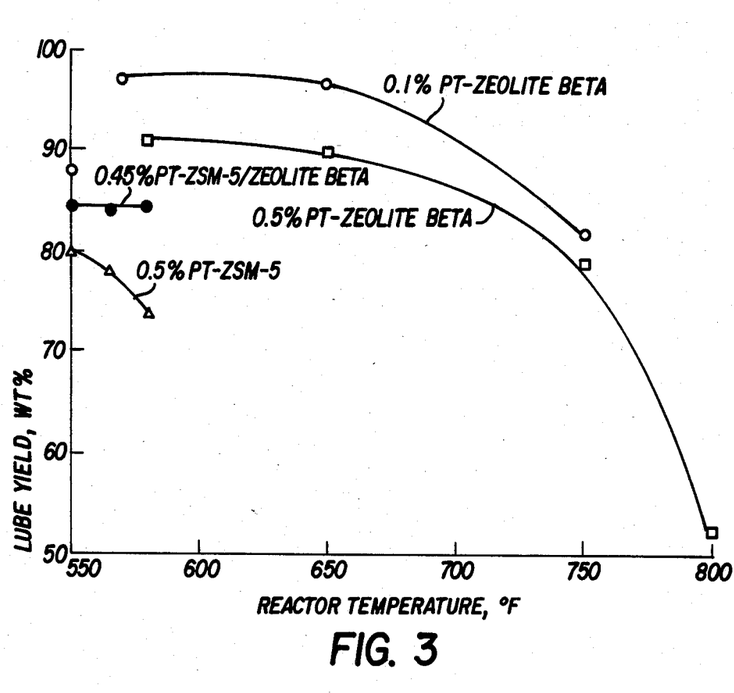
FIG. 3 shows a comparison of lube yield and reactor temperature for Pt-ZSM-5, Pt-ZSM-5/Zeolite Beta and Pt-Zeolite Beta on a light neutral chargestock.

FIG. 3, which plots the relationship of lube yield vs. reactor temperature for Pt-ZSM-5, Pt-ZSM-5/Zeolite Beta, and Pt-Zeolite Beta, illustrates that at the reactor temperature below 650° F., lube yield is greater than 90% for Pt-Zeolite Beta. At temperatures above 650° F., lube yield decreases. With respect to Pt-ZSM-5, lube stock yield decreased with increasing reactor temperatures. The lube stock yield remained constant at 85 wt. % at increasing temperatures for Pt-ZSM-5/Zeolite Beta.

Tests conducted with Pt-ZSM-11/Zeolite Beta and Pt-ZSM-23/Zeolite Beta are summarized as follows:
(a) The Pt-ZSM-11/Zeolite Beta catalyst gave 3-5 numbers higher V.I.'s and 3-5 wt % higher lube yields than Ni-ZSM-5;
(b) The Pt-ZSM-23/Zeolite Beta catalyst produced 3-4 wt % higher lube yield with V.I.'s 6-8 numbers higher than Ni-ZSM-5; and
(c) Three Zeolite Beta based composite catalysts: ZSM-5/Zeolite Beta, ZSM-11/Zeolite Beta and ZSM-23/Zeolite Beta, produced almost equivalent lube yield, but the ZSM-23/Zeolite Beta catalyst gave the highest V.I. improvement.

Referring now to ZSM-11, the following Table shows a comparison of a dewaxed lube oil processed with Pt-ZSM-11/Zeolite Beta and Pt-ZSM-11 at 15° F. pour point.

| Catalyst | Pt-ZSM-11 | Pt-ZSM-11/Zeolite Beta |
|---|---|---|
| Pour Point, °F. | 15 | 15 |
| Reactor Temp., °F. | 540 | 590 |
| Days-on-Stream | 3.5 | 6.5 |
| Gravity, API° | 29.0 | 28.9 |
| Lube Yield, wt. % | 81.9 | 84.1 |
| KV at 40° C., cs | 42.32 | 41.0 |
| KV at 100° C., cs | 6.31 | 6.294 |
| VI | 95.2 | 95.8 |
| Sulfur, wt. % | 0.84 | 0.88 |
| Basic Nitrogen, ppm | 43 | 37 |

Compared to Pt-ZSM-11, the Pt-ZSM-11/Zeolite Beta catalyst improved lube yield by 2% by weight, and offered a little V.I. improvement. Because of the relatively low cracking activity of Zeolite Beta, the Pt-ZSM-11/Zeolite Beta catalyst is about 30° F. less active than Pt-ZSM-11 after the correction for catalyst aging.

As to product gravity, kinematic viscosities, sulfur and nitrogen contents, little or no difference was observed between Pt-ZSM-11 and Pt-ZSM-11/Zeolite Beta.

With the same feed charge at 1 LHSV, Pt/Zeolite Beta needed a processing temperature of 800° F. to reduce the pour point to 5° F. But Pt-ZSM-11/Zeolite Beta needed only 600° F. and, therefore, is at least 200° F. more active than Pt/Zeolite Beta. Apparently, Pt/Zeolite Beta by itself has very low dewaxing activity under normal lube oil dewaxing conditions. The comparisons are as follows:

| Catalyst | Pt-ZSM-11/C-56 | Pt/C-56 |
|---|---|---|
| Pour Point, °F. | 5 | 5 |
| Reactor Temp., °F. | 600 | 800 |
| Days-on-Stream | 7.5 | 6 |
| Gravity, API° | 28.8 | 29.0 |
| Lube Yield, wt. % | 83.0 | 52.5 |
| KV at 40° C., cs | 42.8 | 13.05 |
| KV at 100° C., cs | 6.339 | 3.035 |
| VI | 94.3 | 80.5 |
| Sulfur, wt. % | 0.85 | 0.22 |
| Basic Nitrogen, ppm | 40 | 5 |

At 800° F., the Pt/Zeolite Beta catalyst exhibited very high cracking activity and thus severely cracked lube molecules. As a result, the lube yield was only 53% with a V.I. of 81. Additionally, the sulfur and nitrogen contents were reduced substantially to 0.22% by weight and less than 5 ppm, respectively. Therefore, the addition of ZSM-11 to Zeolite Beta offers the necessary cracking activity for lube dewaxing under normal conditions.

Figure 4:
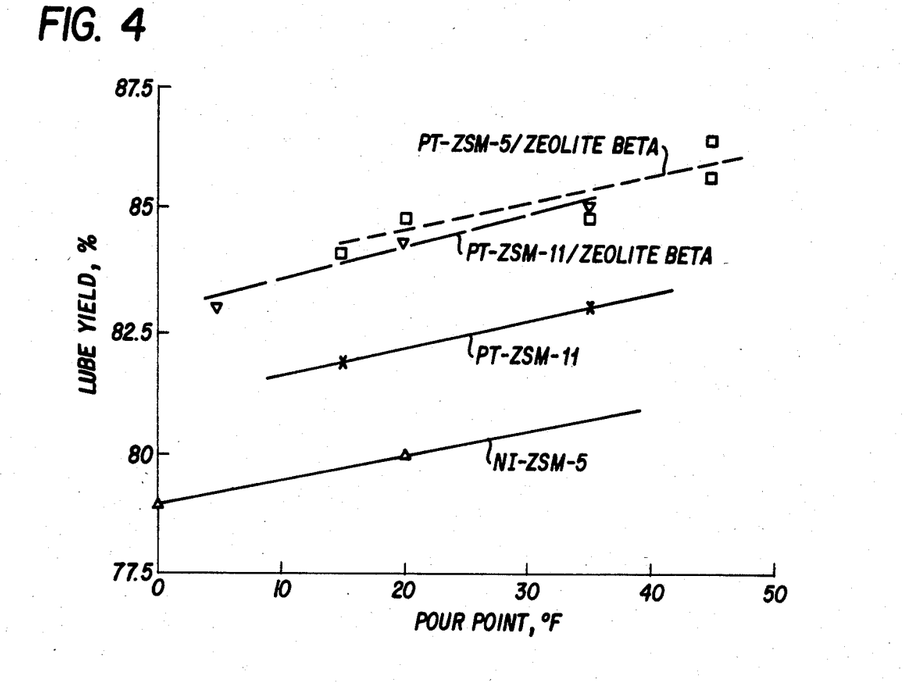
FIG. 4 shows a comparison of lube yield and pour point for steamed Ni-ZSM-5, Pt-ZSM-11, Pt-ZSM-11/Zeolite Beta and Pt-ZSM-5/Zeolite Beta.
Figure 5:
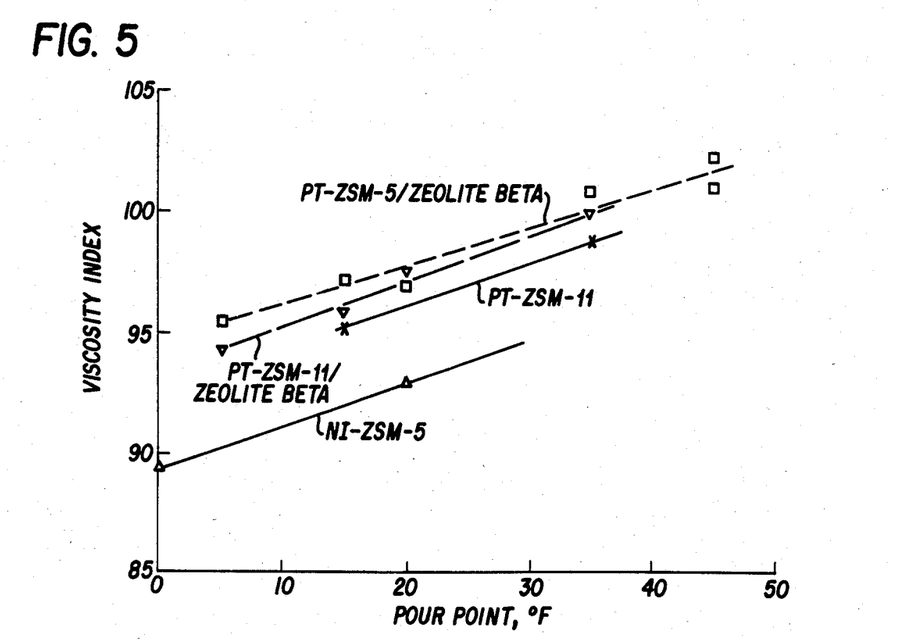
FIG. 5 shows a comparison of viscosity index and pour point for steamed Ni-ZSM-5, Pt-ZSM-11, Pt-ZSM-11/Zeolite Beta and Pt-ZSM-5/Zeolite Beta.

FIGS. 4 and 5 compare lube yields and V.I.'s, respectively, for steamed Ni-ZSM-5, Pt-ZSM-11, Pt-ZSM-11/Zeolite Beta and Pt-ZSM-5/Zeolite Beta. Compared to steamed Ni-ZSM-5/, Pt-ZSM-5/Zeolite Beta had the highest improvement in lube yield and V.I., followed by Pt-ZSM-11/Zeolite Beta and Pt-ZSM-11.

Referring now to ZSM-23, the following Table gives a comparison of the properties of a dewaxed product processed with Pt-ZSM-23/Zeolite Beta, Pt-ZSM-5/Zeolite Beta and Pt-ZSM-11/Zeolite Beta:

| Catalyst | Pt-ZSM-11/Zeolite Beta | Pt-ZSM-5/Zeolite Beta | Pt-ZSM-23 Zeolite Beta |
|---|---|---|---|
| Pour Point, °F. | 20 | 20 | 25 |
| Reactor Temp., °F. | 580 | 565 | 680 |
| Days-on-Stream | 5.5 | 2 | 7 |
| Gravity, API° | 29.1 | 28.9 | 30.1 |
| Lube Yield, wt. % | 84.3 | 84.8 | 84.6 |
| KV at 40° C., cs | 41.06 | 42.44 | 38.83 |
| KV at 100° C., | 6.236 | 6.363 | 6.084 |
| VI | 97.5 | 97.0 | 100.9 |
| Sulfur, wt. % | 0.85 | 0.88 | 0.27 |
| Basic Nitrogen, ppm | 34 | 32 | 26 |

At 20° or 25° F. pour, the product from the ZSM-23/Zeolite Beta catalyst has the highest V.I. compared to either ZSM-11/Zeolite Beta or ZSM-5/Zeolite Beta. The sulfur level in the product from ZSM-23/Zeolite Beta was only 30% of that present in the products from ZSM-11/Zeolite Beta and ZSM-5/Zeolite Beta. The degree of sulfur removal in the ZSM-23/Zeolite Beta product may substantially contribute to the increased V.I. observed.

Figure 6:
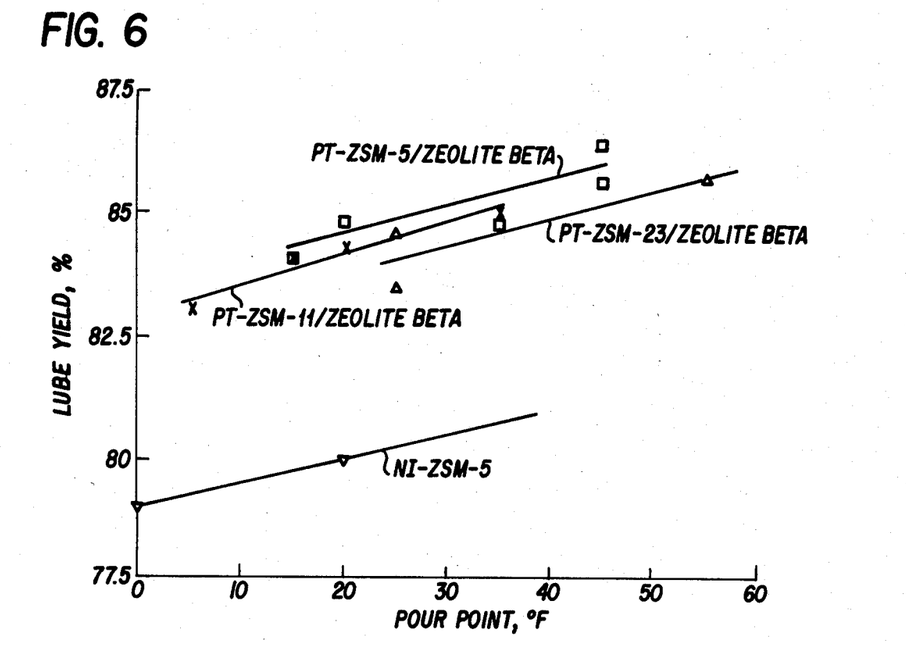
FIG. 6 shows a comparison of lube yield and pour point for Pt-ZSM-11/Zeolite Beta, Pt-ZSM-5/Zeolite Beta, Pt-ZSM-23/Zeolite Beta and Ni-ZSM-5.
Figure 7:
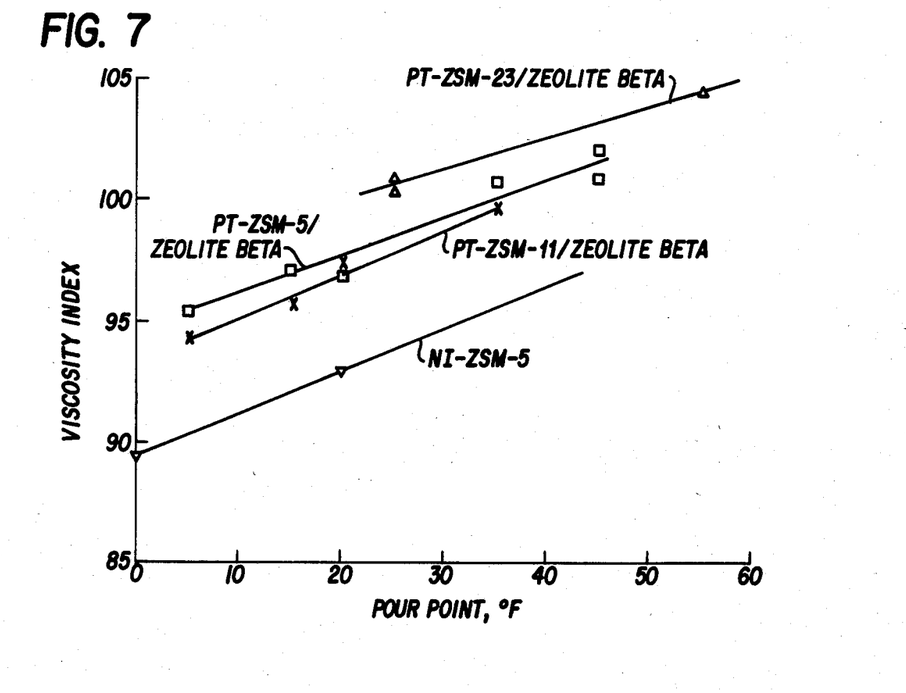
FIG. 7 shows a comparison of viscosity index and pour point for Pt-ZSM-11/Zeolite ,Beta, Pt-ZSM-5/Zeolite Beta, Pt-ZSM-23/Zeolite Beta and Ni-ZSM-5.

Shown in FIGS. 6 and 7 are the relationship of lube yield and viscosity index versus pour point, respectively, for Pt-ZSM-11/Zeolite Beta, Pt-ZSM-5/Zeolite Beta, Pt-ZSM-23/Zeolite Beta, and Ni-ZSM-5. Compared to steamed Ni-ZSM-5, the ZSM-23/Zeolite Beta catalyst gave 3-4% by weight yield and 6-8 numbers V.I. advantage for Paulsboro light neutral.

The V.I. improvement with ZSM-23/Zeolite Beta is the highest among the tested catalysts, although the degree of desulfurization may contribute substantially to the V.I. All the composite catalysts give the similar improvement in lube yield. The lube yield and V.I. improvements relative to steamed Ni-ZSM-5 are summarized as follows:

| Process Improvement With Composite Catalysts | | |
|---|---|---|
| | Lube Yield, wt. % | V.I. |
| Pt-ZSM-5/Zeolite Beta | +3-5 | +4-7 |
| Pt-ZSM-11/Zeolite Beta | +3-5 | +3-5 |
| Pt-ZSM-23/Zeolite Beta | +3-4 | +6-8 |

EXAMPLES 30-39

In the following examples, the chargestock used was a heavy neutral lubricating oil chargestock having the following properties:

| | Heavy Neutral Stock |
|---|---|
| Specific Gravity | 0.8945 |
| API° | 26.5 |
| Pour Point, °F. | 110 |
| Cloud Point, °F. | 120 |
| Viscosity KV at 100° C. | 12.33 |
| Sulfur, Wt. % | 1.07 |
| Basic Nitrogen, ppm | 64 |
| Hydrogen, Wt. % | 13.57 |
| ASTM Color | 4.0 |

EXAMPLES 30-33

Examples 30-33 illustrate the effect of steamed Ni-ZSM-5 on the heavy neutral lube stock. The procedure of Examples 1-2 was followed under conditions specified in Table 11, which also recites the results.

TABLE 11

| Example No. | 30 | 31 | 32 | 33 |
|---|---|---|---|---|
| Temperature, °F. | 600 | 600 | 600 | 600 |
| Pressure, psig | 400 | 400 | 400 | 400 |
| Gas | $H_2$ | $H_2$ | $H_2$ | $H_2$ |
| Circulation, SCF/bbl | 2451 | 2358 | 2520 | 2554 |
| Time on Stream, days | 3.5 | 5.5 | 7.5 | 8.5 |
| Run Time, hours | 22 | 67 | 21 | 20 |
| LHSV, v/v/hr | 1.09 | 1.06 | 0.98 | 0.99 |
| Material Balance, % | 95.7 | 100.0 | 101.1 | 98.3 |
| Yields, Wt % | | | | |
| $C_1 + C_2$ | 0.4 | 0.2 | 0.4 | 0.4 |
| $C_3$ | 4.1 | 4.9 | 3.2 | 2.8 |
| $C_4$ | 4.5 | 4.2 | 4.3 | 3.9 |
| $C_5$ | 3.0 | 3.0 | 4.6 | 4.7 |
| $C_6$—650° F. | 5.1 | 5.0 | 4.6 | 4.8 |
| 650° F.+ Lube | 82.9 | 82.7 | 82.9 | 83.4 |
| Specific Gravity | 0.9015 | 0.9007 | 0.9002 | 0.9000 |
| API° | 25.5 | 25.6 | 25.7 | 25.7 |
| Pour Point, °F. | −5 | 0 | 10 | 10 |
| Cloud Point, °F. | −4 | 14 | 14 | 18 |
| KV at 100° F. | 172.2 | 167.9 | 166.8 | 167.6 |
| KV at 210° F. | 14.23 | 14.14 | 14.13 | 14.20 |
| KV at 40° C. | 151.1 | 147.5 | 146.6 | 147.2 |
| KV at 100° C. | 13.81 | 13.72 | 13.71 | 13.78 |
| SUS at 100° F. | 798 | 778 | 773 | 776 |
| SUS at 210° F. | 74.9 | 74.5 | 74.5 | 74.8 |
| Viscosity Index | 85.2 | 86.9 | 87.5 | 88.0 |
| Sulfur, Wt % | 1.24 | 1.22 | 1.22 | 1.21 |

TABLE 11-continued

| Example No. | 30 | 31 | 32 | 33 |
|---|---|---|---|---|
| Basic Nitrogen, ppm | 69 | 71 | 77 | 72 |
| Hydrogen, Wt. % | 13.38 | 13.26 | 13.41 | 13.30 |
| ASTM Color | L2.0 | L2.5 | L2.5 | L2.5 |

EXAMPLES 34-39

Examples 34-39 illustrate the effect of unsteamed Pt-ZSM-5/Zeolite Beta on the heavy neutral lube stock. The procedure of Examples 5-6 was followed under conditions specified in Table 12, which also recites the results.

TABLE 12

| Example No. | 34 | 35 | 36 | 37 | 38 | 39 |
|---|---|---|---|---|---|---|
| Temperature, °F. | 580 | 600 | 580 | 565 | 565 | 565 |
| Pressure, psig | 400 | 400 | 400 | 400 | 400 | 400 |
| Gas | H$_2$ | H$_2$ | H$_2$ | H$_2$ | H$_2$ | H$_2$ |
| Circulation, SCF/bbl | 2760 | 2225 | 1990 | 2472 | 2490 | 2618 |
| Time on Stream, days | 2 | 4 | 7 | 2 | 4 | 6 |
| Run Time, hours | 23 | 66 | 20 | 23 | 66 | 22 |
| LHSV, v/v/hr | 0.92 | 1.14 | 1.27 | 1.02 | 1.03 | 0.98 |
| Material Balance, % | 99.9 | 95.7 | 99.2 | 101.7 | 98.6 | 102.2 |
| Yields, Wt % | | | | | | |
| C$_1$ + C$_2$ | 0.4 | 0.4 | 0.3 | 0.3 | 0.3 | 0.3 |
| C$_3$ | 4.1 | 2.4 | 0.7 | 1.7 | 1.2 | 0.6 |
| C$_4$ | 5.0 | 4.6 | 2.2 | 2.9 | 2.2 | 2.2 |
| C$_5$ | 2.2 | 2.6 | 2.2 | 2.3 | 1.8 | 1.9 |
| C$_6$—650° F. | 4.9 | 4.1 | 3.0 | 3.8 | 3.0 | 2.7 |
| 650° F.+ Lube | 83.4 | 85.9 | 91.6 | 89.0 | 91.6 | 92.3 |
| Specific Gravity | 0.9008 | 0.8996 | 0.8958 | 0.8971 | 0.8947 | 0.8953 |
| API° | 25.6 | 25.8 | 26.2 | 26.2 | 26.5 | 26.6 |
| Pour Point, °F. | 5 | 15 | 60 | 45 | 70 | 75 |
| Cloud Point, °F. | 12 | 26 | NA | NA | NA | NA |
| KV at 100° F. | 180.6 | 176.6 | 159.2 | 165.5 | 156.4 | 153.3 |
| KV at 210° F. | 14.91 | 14.88 | 14.45 | 14.53 | 14.27 | 14.15 |
| KV at 40° C. | 158.5 | 155.2 | 140.5 | 145.8 | 138.1 | 135.4 |
| KV at 100° C. | 14.46 | 14.44 | 14.03 | 14.10 | 13.86 | 13.74 |
| SUS at 100° F. | 837 | 818 | 737 | 767 | 725 | 710 |
| SUS at 210° F. | 77.5 | 77.4 | 75.7 | 76 | 75.1 | 74.6 |
| Viscosity Index | 87.8 | 90.0 | 96.3 | 93.1 | 96.3 | 97.0 |
| Sulfur, Wt % | 1.25 | 1.22 | 1.16 | 1.21 | 1.19 | 1.18 |
| Basic Nitrogen, ppm | 71 | 44 | 110 | 79 | 77 | 69 |
| Hydrogen, Wt. % | 13.22 | 13.21 | 13.54 | 13.24 | 13.60 | 13.50 |
| ASTM Color | 6.5 | 8.0 | D8.0 | 8.0 | D8.0 | D8.0 |

The results of Examples 30-39 indicate that V.I. and lube yield were improved by approximately 1-2 numbers and 2-3 wt. % respectively when processed with the Pt-ZSM-5/Zeolite Beta. Both catalysts produced lube stock products which are comparable in specific gravity, hydrogen, sulfur and nitrogen contents.

EXAMPLES 40-50

In the following examples, the chargestock used was a waxy bright lubricating oil chargestock raffinate having the following properties:

| | Waxy Bright Stock Raffinate |
|---|---|
| Specific Gravity | 0.9036 |
| API° | 25.1 |
| Pour Point, °F. | 120 |
| Cloud Point, °F. | #120 |
| Viscosity KV at 100° C. | 29.06 |
| Sulfur, Wt. % | 1.13 |
| Basic Nitrogen, ppm | 130 |

# = Greater Than

EXAMPLES 40-45

Examples 40-45 illustrate the effect of steamed Ni-ZSM-5 on the waxy bright lube stock raffinate. The procedure of Examples 1-2 was followed under conditions specified in Table 13, which also recites the results.

TABLE 13

| Example No. | 40 | 41 | 42 | 43 | 44 | 45 |
|---|---|---|---|---|---|---|
| Temperature, °F. | 600 | 625 | 550 | 550 | 550 | 590 |
| Pressure, psig | 400 | 400 | 400 | 400 | 400 | 400 |
| Gas | H$_2$ | H$_2$ | H$_2$ | H$_2$ | H$_2$ | H$_2$ |
| Circulation, SCF/bbl | 2474 | 2523 | 2435 | 2294 | 2083 | 2273 |
| Time on Stream, days | 1.9 | 2.9 | 2 | 3 | 4 | 5 |
| Run Time, hours | 23 | 22 | 22 | 23 | 24 | 20 |
| LHSV, v/v/hr | 0.96 | 1.09 | 0.77 | 1.09 | 0.60 | 0.55 |
| Material Balance, % | 96.2 | 97.0 | 96.7 | 97.5 | 97.5 | 97.5 |
| Yields, Wt % | | | | | | |
| C$_1$ + C$_2$ | 0.35 | 0.61 | 0.26 | 0.06 | 0.20 | 0.44 |
| C$_3$ | 3.95 | 5.47 | 2.17 | 1.46 | 2.29 | 4.24 |
| C$_4$ | 4.18 | 5.16 | 2.96 | 2.37 | 2.59 | 3.25 |
| C$_5$ | 2.27 | 2.98 | 2.17 | 1.61 | 1.54 | 1.56 |
| C$_6$—650° F. | 2.38 | 2.29 | 2.48 | 1.99 | 2.39 | 3.15 |
| 650° F.+ Lube | 86.87 | 83.49 | 89.96 | 92.51 | 90.99 | 87.36 |
| Specific Gravity | 0.9094 | 0.9115 | 0.9086 | 0.9073 | 0.9085 | 0.9105 |

TABLE 13-continued

| Example No. | 40 | 41 | 42 | 43 | 44 | 45 |
|---|---|---|---|---|---|---|
| API° | 24.1 | 23.7 | 24.2 | 24.5 | 24.2 | 23.9 |
| Pour Point, °F. | 0 | 0 | 20 | 40 | 30 | 5 |
| Cloud Point, °F. | 18 | No Cloud | 26 | 54 | NA | 9 |
| KV at 100° F. | 592.6 | 605.0 | 572.1 | 559.5 | 579.1 | 618.6 |
| KV at 210° F. | 32.76 | 32.74 | 33.01 | 3.06 | 33.41 | 33.57 |
| KV at 40° C. | 510.0 | 520.0 | 493.7 | 483.6 | 499.8 | 521.9 |
| KV at 100° C. | 31.62 | 31.59 | 31.87 | 31.93 | 32.26 | 32.39 |
| SUS at 100° F. | 2745 | 2802 | 2650 | 2592 | 2682 | 2865 |
| SUS at 210° F. | 154.9 | 154.8 | 156.1 | 156.3 | 157.9 | 158.6 |
| Viscosity Index | 92.0 | 90.4 | 95.4 | 97.1 | 95.8 | 91.7 |
| Sulfur, Wt % | 1.40 | 1.42 | 1.11 | 1.12 | 1.27 | 1.24 |
| Basic Nitrogen, ppm | 87 | 122 | 112 | 108 | 116 | 122 |
| Hydrogen, Wt. % | 13.04 | 13.00 | 13.24 | 13.28 | 13.12 | 13.12 |
| ASTM Color | L4.0 | 4.0 | L5.5 | L6.0 | D8.0 | D8.0 |

EXAMPLES 46-50

Examples 46-50 illustrate the effect of unsteamed Pt-ZSM-5/Zeolite Beta on waxy bright lube chargestock raffinate. The procedure of Examples 5-6 was followed under conditions specified in Table 14, which also recites the results.

TABLE 14

| Example No. | 46 | 47 | 48 | 49 | 50 |
|---|---|---|---|---|---|
| Temperature, °F. | 565 | 565 | 600 | 600 | 600 |
| Pressure, psig | 400 | 400 | 400 | 400 | 400 |
| Gas | $H_2$ | $H_2$ | $H_2$ | $H_2$ | $H_2$ |
| Circulation, SCF/bbl | 2589 | 2539 | 2573 | 2573 | 2529 |
| Time on Stream, days | 2 | 3 | 4 | 5 | 6 |
| Run Time, hours | 23 | 23 | 22 | 20 | 23 |
| LHSV, v/v/hr | 0.75 | 0.76 | 0.74 | 0.75 | 0.75 |
| Material Balance, % | 99.0 | 100.8 | — | 100.6 | 101.5 |
| Yields, Wt % | | | | | |
| $C_1 + C_2$ | 0.4 | 0.4 | — | 0.5 | 0.3 |
| $C_3$ | 3.7 | 3.2 | — | 4.6 | 4.1 |
| $C_4$ | 4.2 | 3.4 | — | 3.6 | 3.4 |
| $C_5$ | 1.6 | 2.2 | — | 2.1 | 1.9 |
| $C_6$—650° F. | 3.8 | 3.3 | — | 3.5 | 3.5 |
| 650° F.+ Lube | 86.3 | 87.5 | — | 85.7 | 86.8 |
| Specific Gravity | 0.9104 | 0.9095 | 0.9113 | 0.9109 | 0.9106 |
| API° | 23.9 | 24.1 | 23.7 | 23.8 | 23.9 |
| Pour Point, °F. | −5 | 0 | −15 | −15 | −5 |
| KV at 100° F. | 576.6 | 564.8 | 597.8 | 590.8 | 582.8 |
| KV at 210° F. | 32.01 | 32.01 | 33.38 | 32.32 | 32.22 |
| KV at 40° C. | 496.3 | 486.8 | 513.8 | 508.1 | 501.5 |
| KV at 100° C. | 30.90 | 30.90 | 31.25 | 31.19 | 31.10 |
| SUS at 100° F. | 2671 | 2616 | 2769 | 2737 | 2699 |
| SUS at 210° F. | 151.5 | 151.5 | 153.2 | 152.9 | 1.52.9 |
| Viscosity Index | 91.4 | 92.9 | 90.0 | 90.7 | 91.4 |
| Sulfur, Wt % | 1.44 | 1.33 | 1.43 | 1.30 | 1.38 |
| Basic Nitrogen, ppm | 116.6 | 106 | | 138 | 110.4 |
| Hydrogen, Wt. % | 13.21 | 13.05 | 13.16 | 13.16 | 13.17 |
| ASTM Color | 8.0 | D8.0 | D8.0 | D8.0 | D8.0 |

D = Darker Than

Figure 8:
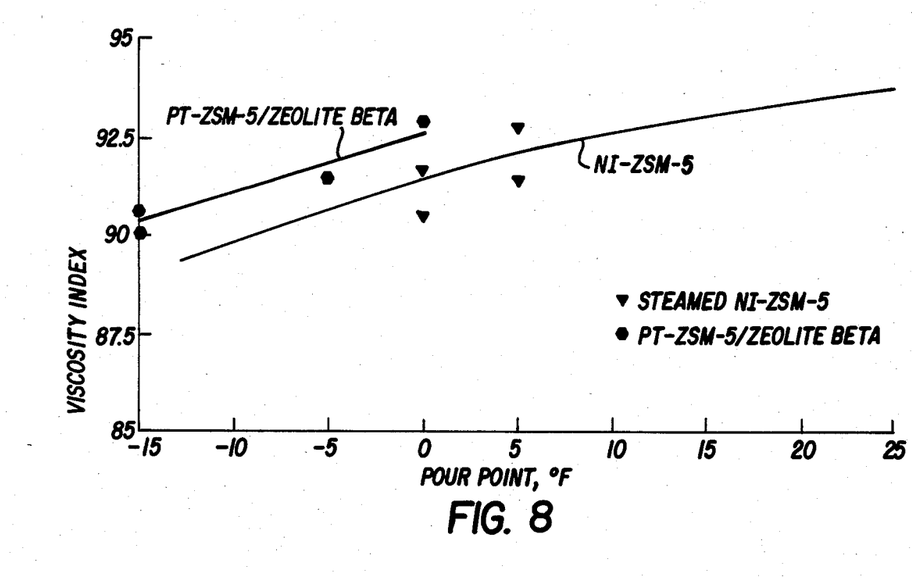
FIG. 8 shows a comparison of viscosity index and pour point for steamed Ni-ZSM-5 and Pt-ZSM-5/Zeolite Beta on waxy bright lube stock raffinate.
Figure 9:
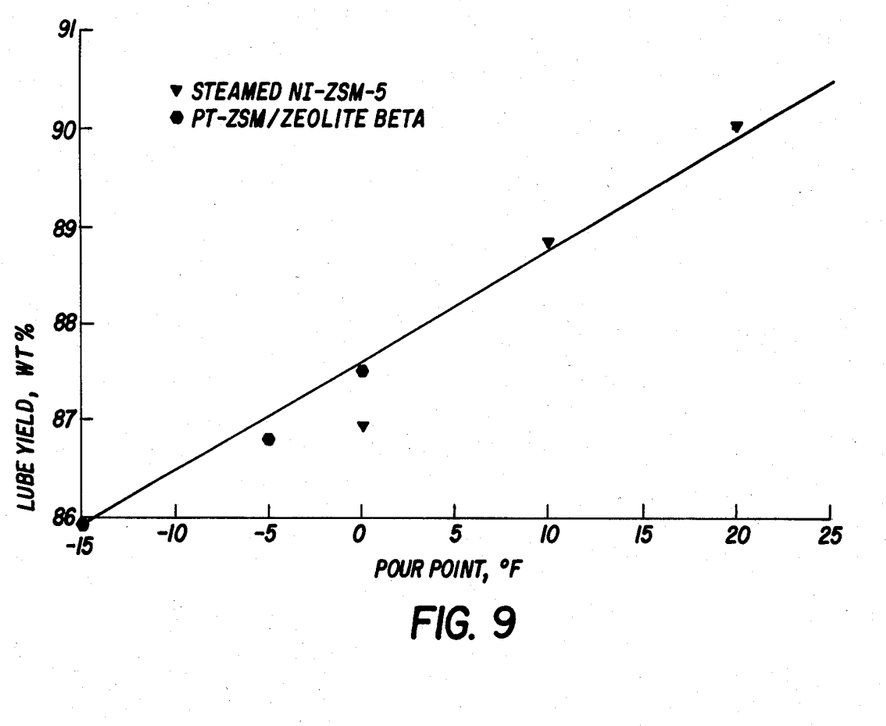
FIG. 9 shows a comparison of lube yield and pour point for steamed Ni-ZSM-5 and Pt-ZSM-5/Zeolite Beta on waxy bright lube stock raffinate.

FIGS. 8 and 9 show the comparison of V.I. or lube yield and pour point for steamed Ni-ZSM-5 and Pt-ZSM-5/Zeolite Beta when used on waxy bright lube stock raffinate. The results indicate that V.I. is slightly improved by the use of Pt-ZSM-5/Zeolite Beta. Lube yields for the catalysts were comparable.

Turning now to Tables 13 and 14, it can be seen that Pt-ZSM-5/Zeolite Beta reduced ONC formation. The ONC's of the product lube at 0° F. pour point were 7 and 25 for Pt-ZSM-5/Zeolite Beta respectively.

In conclusion, the medium pore zeolite/large pore zeolite catalysts have been shown to be unexpectedly superior to prior art lube dewaxing catalysts, e.g., Ni-ZSM-5, and Zeolite Beta, especially in terms of V.I., lubricating oil yield and ONC with a variety of lube oil feedstocks.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

We claim:

1. A composition having catalytic properties comprising, in combination, a crystalline silicate medium pore zeolite having a Constraint Index between 2 and 12, Zeolite Beta and a hydrogenation component, wherein the ratio of said Zeolite Beta to said medium pore zeolite is not greater than 1.

2. The composition of claim 1, wherein said hydrogenation component is a metal selected from any of Groups VI, VII and VIII of the Periodic Table and mixtures thereof.

3. The composition of claim 1, wherein said hydrogenation component comprises platinum.

4. The composition of claim 1, wherein said hydrogenation component comprises nickel.

5. The composition of claim 1, further comprising a binder.

6. The composition of claim 1, wherein said medium pore zeolite is present in an amount from 5 to 60 wt. % and said Zeolite Beta is present in an amount from 5 to 60 wt. %.

7. The composition of claim 5, wherein said binder is present in an amount not greater than 50 wt. %.

8. The composition of claim 5, wherein said medium pore zeolite is present in an amount of 55 wt. %, said Zeolite Beta in an amount of 10 wt. %, and said binder in an amount of 35 wt. %.

9. The composition of claim 5, wherein said binder is selected from the group consisting of alpha alumina monohydrate silica, silica-alumina, naturally-occurring clays and mixtures thereof.

10. A process for preparing a lube stock dewaxing catalyst, said process comprising:
    (a) combining together from about 5 to 60 wt % medium pore zeolite, from about 5 to 60 wt % Zeolite Beta, from 0 to about 50 wt % binder and a sufficient amount of water into a mixture;
    (b) extruding said mixture;
    (c) drying said mixture; and
    (d) incorporating a hydrogenation component into said mixture.

11. The process according to claim 10, further comprising calcining said mixture.

* * * * *